(12) United States Patent
Ho

(10) Patent No.: US 9,780,991 B2
(45) Date of Patent: Oct. 3, 2017

(54) I/Q IMBALANCE CORRECTION FOR THE COMBINATION OF MULTIPLE RADIO FREQUENCY FRONTENDS

(71) Applicant: QUALCOMM INCORPORATED, San Diego, CA (US)

(72) Inventor: Ricky Keangpo Ho, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/988,993

(22) Filed: Jan. 6, 2016

(65) Prior Publication Data
US 2016/0197763 A1    Jul. 7, 2016

Related U.S. Application Data

(60) Provisional application No. 62/100,841, filed on Jan. 7, 2015.

(51) Int. Cl.
| | |
|---|---|
| *H04B 1/12* | (2006.01) |
| *H04L 27/38* | (2006.01) |
| *H04L 27/36* | (2006.01) |
| *H04B 1/30* | (2006.01) |
| *H04L 27/20* | (2006.01) |

(52) U.S. Cl.
CPC ............ *H04L 27/3863* (2013.01); *H04B 1/30* (2013.01); *H04L 27/2089* (2013.01); *H04L 27/364* (2013.01)

(58) Field of Classification Search
CPC ................ H03D 3/009; H04L 27/3863; H04L 2027/0016; H04L 27/364; H04B 1/123
USPC ......................................................... 375/346
See application file for complete search history.

(56) References Cited

U.S. PATENT DOCUMENTS

| | | | |
|---|---|---|---|
| 2008/0159442 A1* | 7/2008 | Tanabe ................ | H04L 27/3863 375/324 |
| 2010/0232490 A1* | 9/2010 | Balakrishnan ......... | H03D 3/009 375/227 |
| 2015/0236739 A1* | 8/2015 | Montalvo ........... | H03M 1/0626 455/307 |

* cited by examiner

*Primary Examiner* — David S Huang
(74) *Attorney, Agent, or Firm* — Holland & Hart LLP/Qualcomm

(57) ABSTRACT

Aspects relate to correcting Inphase/Quadrature (I/Q) imbalances across multiple wireless elements such as multiple receive elements or multiple transmit elements. In one example implementation, I/Q imbalances can be corrected using a digital circuit provided within a digital portion of a direct conversion wireless element (upconversion or downconversion) that implements only two multiplications and one addition per pair of I and Q samples.

13 Claims, 2 Drawing Sheets

I/Q IMBALANCE CORRECTION FOR THE COMBINATION OF MULTIPLE RADIO FREQUENCY FRONTENDS

CROSS REFERENCE TO RELATED APPLICATIONS

This application claims priority from U.S. Provisional App. No. 62/100,841, filed on Jan. 7, 2015, which is incorporated by reference in its entirety for all purposes.

BACKGROUND

Field

Aspects relate to wireless communication systems that include a radio frequency (RF) mixer used to downconvert a RF signal to baseband in the receiver or to upconvert a baseband signal into an RF signal in the transmitter, and in a more particular aspect, to correcting imbalances between Inphase (I) and Quadrature (Q) (IQ or I/Q) components in an RF communication system having multiple receiver and/or transmitter RF elements.

Related Art

IQ modulation and demodulation are used in wireless communication systems to fully utilize all degrees of freedom in a radio frequency (RF) signal. Due to non-idealities in transceiver hardware, especially the mixer in the up- or down-conversion imbalances arise between the Inphase (I) and Quadrature (Q) components. The IQ components may have different mean amplitude or gain. In additional, the phase difference between the I and Q components may be off from the ideal quadrature difference of 90°. In additional to the mixer, these imbalances can exist both at a transmitter and a receiver, and can arise from effects such as phase and amplitude variation in clocking, trace difference in the IQ branches, as well as phase and amplitude variation in filtering for the I and Q branches of transmitters and receivers. Such imbalances can degrade the capabilities and performance of the communication system.

SUMMARY

In one aspect, the disclosure pertains to a method of receiving or transmitting Inphase and Quadrature (I/Q) signal components in a Radio Frequency (RF) wireless communication system. For receiving, an example method comprises, at each of a plurality of elements, receiving an RF signal comprising Inphase and Quadrature components to produce an analog signal, mixing a local oscillator signal with the received analog signal to produce an Inphase signal component, mixing a quadrature phase offset local oscillator signal with the received analog signal to produce a Quadrature signal component, and filtering each of the Inphase and Quadrature signal components. The method also comprises combining the respective Inphase components and combining the respective Quadrature components from the plurality of elements and digitizing each of the combined Inphase components and the combined Quadrature components. For a practical system having imbalance in each Inphase and Quadrature components, the method further comprises applying a respective correction factor to each of the combined Inphase components and the combined Quadrature components, the correction factors calculated to compensate for an imbalance between the combined Inphase components and the combined Quadrature components, within a phase shift and scale factor, and wherein the applying requires no more than two multiplications and one addition for each pair of I and Q samples In a further aspect of the disclosure, a method of transmitting a signal having both Inphase and Quadrature (I/Q) signal components in a RadioFrequency (RF) wireless communication system, comprises applying a respective correction factor to Inphase (I) and Quadrature (Q) components of a digital signal, each correction factor calculated to compensate for an imbalance between the I component and the Q component, within a phase shift and scale factor, and wherein the applying requires no more than two multiplications and one addition total for each pair of I and Q samples. The method also comprises converting the corrected I and Q components to analog, splitting the corrected I component to a plurality of transmit paths with different analog I components and splitting the corrected Q component to a plurality of transmit paths with different analog Q components. The method also comprises mixing the analog I component with an Inphase local oscillator signal and mixing the Quadrature component with a quadrature phase offset oscillator signal, and transmitting each of the Inphase and Quadrature components.

A further method of correcting imbalance between Inphase (I) and Quadrature (Q) (I/Q) signal components in an RadioFrequency (RF) communication system with multiple RF front ends, comprises providing a correction matrix based on gain and phase differences between I and Q components of each RF front end. The correction matrix has two rows and two columns, wherein one entry is zero, one entry is 1, and the remaining values are constants that are pre-calculated based on the I/Q imbalance of multiple RF front ends. The method includes matrix multiplying the correction matrix with I and Q components of a digital sample (sample of each of the I and Q components) of the digital signal to produce corrected I/Q components. If transmitting the digital signal, the method comprises converting the pre-corrected digital I/Q components to analog components, mixing with a respective Local Oscillator to produce mixed I/Q components and transmitting the mixed I/Q components through multiple front ends. If receiving, the method comprises converting multiple versions of an analog signal received through multiple front ends into respective baseband I/Q components, combining respective baseband I/Q components to produce combined baseband I/Q components, digitizing the combined baseband I/Q components, and performing the matrix multiplication on the digitalized baseband I/Q components.

DETAILED DESCRIPTION

Figure 1:
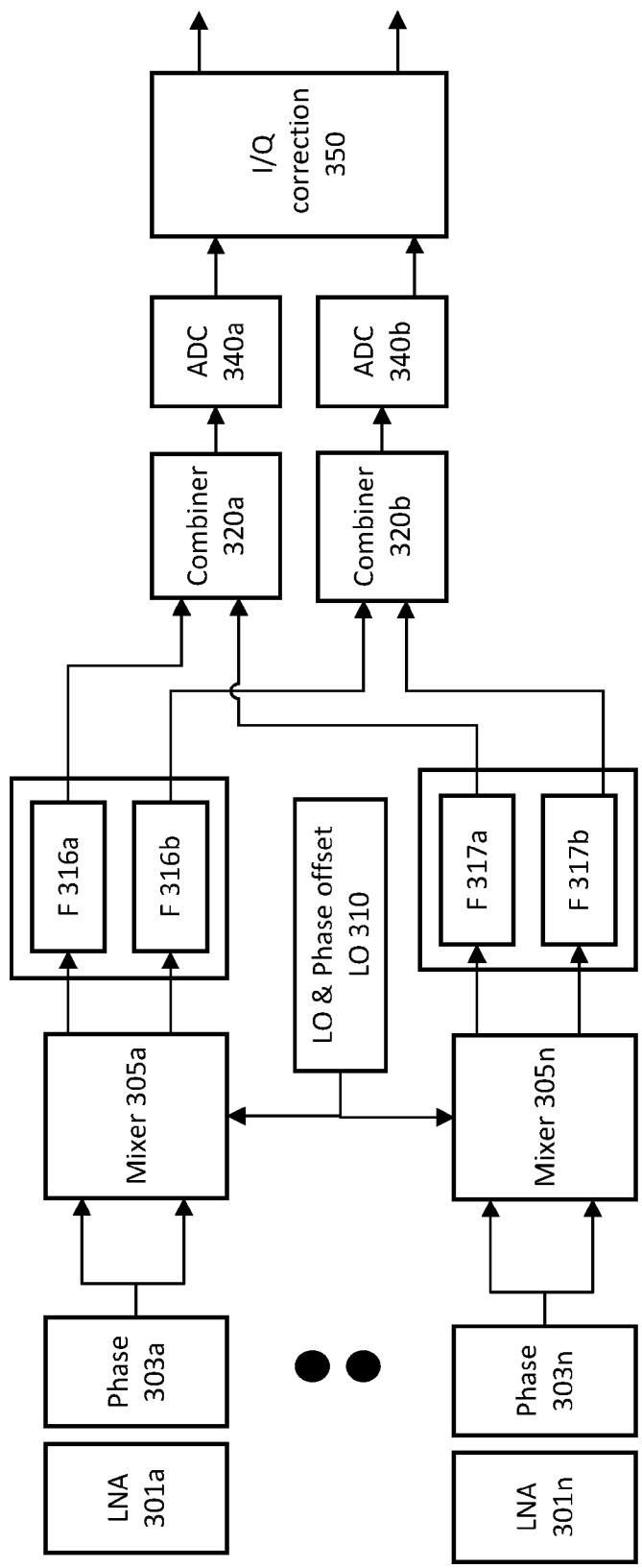
FIG. 1 depicts an example downconverter with multiple RF front end elements for which I/Q imbalances are corrected according to the disclosure.

To better use limited bandwidth in wireless communication, both amplitude and phase of a RF carrier can be modulated with data. Amplitude and phase information may be expressed in a complex number with Inphase (real part) and Quadrature (imaginary part) signal components. In a system with imbalance between I and Q paths, an input signal, $s_{in}=I+jQ$, has a corresponding output signal $s_{out}=I'+$ jQ' that may be different from the input signal. Such input and output relationship applies to both upconversion at a transmitter and downconversion at a receiver. Likewise aspects of the present disclosure apply to both upconversion and downconversion, and systems that perform one or more of upconversion and downconversion. For clarity of explanation, this disclosure focuses primarily on an example of correcting I/Q imbalances in downconversion and those of ordinary skill in the art would be able to use these teachings in the context of upconversion also. The upconversion and downconversion operations can be modeled as a matrix transpose from each other.

In a downconverter, the relationship between input and output can be described by the transfer matrix (1), where g is gain imbalance (other than unity) and phase imbalance is θ:

$$\begin{bmatrix} I' \\ Q' \end{bmatrix} = \begin{bmatrix} g\cos\left(\frac{\theta}{2}\right) & g\sin\left(\frac{\theta}{2}\right) \\ g^{-1}\sin\left(\frac{\theta}{2}\right) & g^{-1}\cos\left(\frac{\theta}{2}\right) \end{bmatrix}\begin{bmatrix} I \\ Q \end{bmatrix} \quad (1)$$

In an example upconverter, an input to output relationship can be described by the transfer matrix (2):

$$\begin{bmatrix} I' \\ Q' \end{bmatrix} = \begin{bmatrix} g\cos\left(\frac{\theta}{2}\right) & g^{-1}\sin\left(\frac{\theta}{2}\right) \\ g\sin\left(\frac{\theta}{2}\right) & g^{-1}\cos\left(\frac{\theta}{2}\right) \end{bmatrix}\begin{bmatrix} I \\ Q \end{bmatrix} \quad (2)$$

In both (1) and (2), the amplitude gain of I/Q branches are g and 1/g, respectively, giving a gain imbalance of 40 log$_{10}$ g in decibel scale, while the phase imbalance is θ. The transfer matrices in (1) and (2) are the transpose of each other.

The I/Q imbalance can be corrected in both an upconverter- and in a downconverter. For an upconverter, other than a constant factor, the I/Q signals can be corrected using a correction matrix (3)

$$\begin{bmatrix} g^{-1}\cos\left(\frac{\theta}{2}\right) & -g^{-1}\sin\left(\frac{\theta}{2}\right) \\ -g\sin\left(\frac{\theta}{2}\right) & g\cos\left(\frac{\theta}{2}\right) \end{bmatrix} \quad (3)$$

The correction matrix (3) is similar to that in (1) with gain imbalance of 1/g and phase imbalance is -θ. A constant factor that is uncorrected does not affect the system performance. For upconverter, the matrix (3) should be used to correct the signal before the RF mixer. Preferably, such correction would be performed in a digital portion of the circuit (as opposed to an analog implementation but analog implementation may not be excluded). A correction matrix equivalent to correction matrix (3) can be used in an upconverter.

For a downconverter, except for a constant factor, an I/Q signal imbalance can be corrected using correction matrix (4):

$$\begin{bmatrix} g^{-1}\cos\left(\frac{\theta}{2}\right) & -g\sin\left(\frac{\theta}{2}\right) \\ -g^{-1}\sin\left(\frac{\theta}{2}\right) & g\cos\left(\frac{\theta}{2}\right) \end{bmatrix}. \quad (4)$$

In a downconverter according to FIG. 1, an implementation of correction matrix (4) would generally be used to correct the signal after the mixer, ideally in a digital circuit or through digital signal processing. Correction matrices (3) and (4) are the transpose of each other. As such I/Q imbalance for upconversion is the transpose of that for downconversion (and vice versa) (both transfer matrices and correction matrices). Because of this transpose relationship, this disclosure focuses on downconversion as a primary example and corresponding upconversion methods, circuitry and systems can be derived by obtaining and implementing the transpose.

In wireless communication, a shift of a constant phase does not affect the system performance. In the transfer matrices of (1) and (4), phase shift is equivalent to a rotation of the matrix. With phase rotation and/or scaling, the correction matrix (4) for a downcoverter is equivalent to any of the following simplifications:

$$\begin{bmatrix} g^{-1} & -g\sin\theta \\ 0 & g\cos\theta \end{bmatrix}, \begin{bmatrix} g^{-2}\sec\theta & -\tan\theta \\ 0 & 1 \end{bmatrix}, \begin{bmatrix} 1 & -g^2\sin\theta \\ 0 & g^2\cos\theta \end{bmatrix}, \begin{bmatrix} g^{-1}\cos\theta & 0 \\ -g^{-1}\sin\theta & g \end{bmatrix},$$

$$\begin{bmatrix} 1 & 0 \\ -\tan\theta & g^2\sec\theta \end{bmatrix}, \begin{bmatrix} g^{-2}\cos\theta & 0 \\ -g^{-2}\sin\theta & 1 \end{bmatrix},$$

where the coefficient of "0" does not require both addition and multiplication, and the coefficient of "1" does not require multiplication.

In practical implementation, with known amplitude imbalance of g and phase imbalance of θ and some pre-calculations, I/Q imbalance correction in digital circuitry requires two multiplications and one addition for each pair of I and Q samples (samples produced by sampling each of the I and Q components). I/Q imbalance correction for the downconverter of FIG. 1 can be implemented using correction matrix (5), where α=-g$^2$ sin θ and β=g$^2$ cos θ:

$$\begin{bmatrix} 1 & -g^2\sin\theta \\ 0 & g^2\cos\theta \end{bmatrix} = \begin{bmatrix} 1 & \alpha \\ 0 & \beta \end{bmatrix} \quad (5)$$

Other choices are possible without increased implementation complexity. There are multiple choices that need two multiplications and one addition.

As shown earlier, I/Q imbalance (and correction) for upconverter and downcoverter are transposes of each other in their corresponding matrix representation. The correction matrix (5) is applicable for both upconverter and downconverter with the correct matrix transpose.

FIG. 1 depicts an example downconverter for a system with multiple RF Front Ends (FEs). Each FE includes a Low Noise Amplifier (LNA) 301a-301n. In additional to I/Q imbalance, FIG. 1 also provides for the possibility that there is a difference in signal phase between FEs, as represented by phase shifts 303a-303n of ϕ$_k$, for k=1, . . . , N. Each FE also has a mixer 305a-305n, which mixes LO signals from LO 310 (as shown in examples of FIGS. 1 and 2, per FE)

with I and Q channels. FIG. 1 depicts a filter for each I and Q for each FE, 316ab-317ab. All of the I components are combined by a combiner and all of the Q components are combined by a combiner (320a and 320b). Each combined signal is converted from analog to digital by an ADC 340a and 340b. I/Q correction is applied by I/Q correction 350, which implements a method according to the disclosure. An upconverter circuit can operate or provide circuitry that operates in reverse to what is depicted in FIG. 1 in order to correct I/Q imbalances in an upconverter circuit for transmitting on multiple FEs, and such circuitry is not depicted here, for clarity of disclosure. In such a transmitter, the combiner of the receiver would instead operate as a splitter, such a splitter may require one or more amplifiers to compensate for splitting loss, in some implementations.

The combiner 320a/320b before each ADC may have difference in amplitude level, represented by respective amplitude gain levels $\gamma_k$, for k=1, . . . , N. As such, the input and output relationship is (I', Q' correspond respectively to I and Q, with an imbalance.)

$$\begin{bmatrix} I' \\ Q' \end{bmatrix} = \left\{ \sum_{k=1}^{N} \gamma_k \begin{bmatrix} g_k \cos\left(\frac{\theta_k}{2}\right) & g_k \sin\left(\frac{\theta_k}{2}\right) \\ g_k^{-1} \sin\left(\frac{\theta_k}{2}\right) & g_k^{-1} \cos\left(\frac{\theta_k}{2}\right) \end{bmatrix} \begin{bmatrix} \cos\phi_k & -\sin\phi_k \\ \sin\phi_k & \cos\phi_k \end{bmatrix} \right\} \begin{bmatrix} I \\ Q \end{bmatrix} \quad (6)$$

or, in general, $$\begin{bmatrix} I' \\ Q' \end{bmatrix} = \begin{bmatrix} A & B \\ C & D \end{bmatrix} \begin{bmatrix} I \\ Q \end{bmatrix} \quad (7)$$

with $$\begin{bmatrix} A & B \\ C & D \end{bmatrix} = \sum_{k=1}^{N} \gamma_k \begin{bmatrix} g_k \cos\left(\frac{\theta_k}{2}\right) & g_k \sin\left(\frac{\theta_k}{2}\right) \\ g_k^{-1} \sin\left(\frac{\theta_k}{2}\right) & g_k^{-1} \cos\left(\frac{\theta_k}{2}\right) \end{bmatrix} \begin{bmatrix} \cos\phi_k & -\sin\phi_k \\ \sin\phi_k & \cos\phi_k \end{bmatrix}. \quad (8)$$

For (8), I/Q correction can compensate the signal up to a phase shift and scale factor. First of all, up to a scale factor equal to AD−BC, the overall I/Q imbalance can be corrected using the correction matrix of $$\begin{bmatrix} D & -B \\ -C & A \end{bmatrix}. \quad (9)$$

If the output signal is rotated with a phase of $\psi=-\tan^{-1}(C/D)$, the overall correction matrix (9) is equivalent to $$\begin{bmatrix} 1 & -\frac{AC+BD}{C^2+D^2} \\ 0 & \frac{AD-BC}{C^2+D^2} \end{bmatrix}. \quad (10)$$

Figure 2:
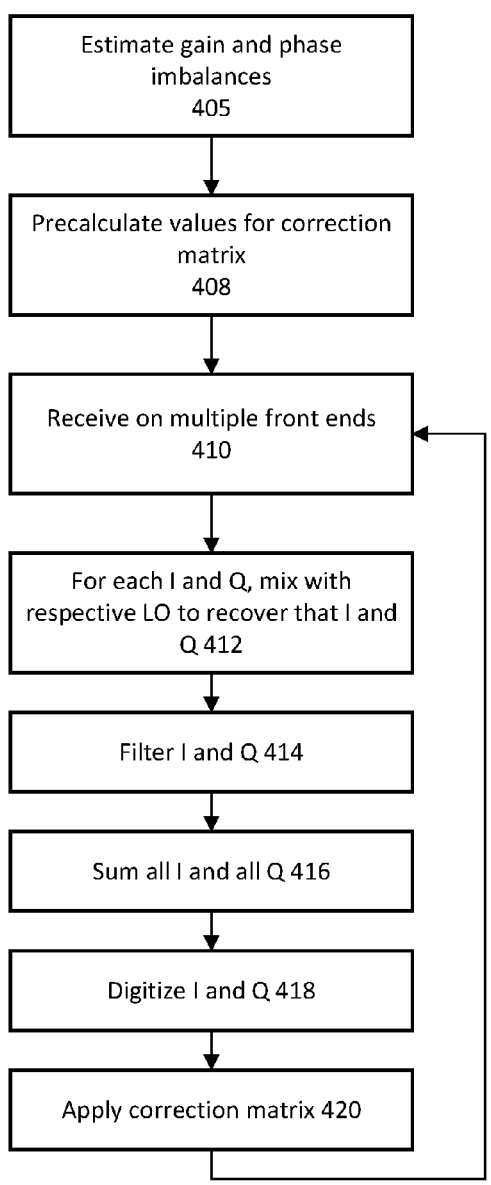
FIG. 2 depicts an example process implemented for I/Q imbalance correction in downconversion.

With this simplification, the I/Q imbalance can be corrected with $$\alpha = -\frac{AC+BD}{C^2+D^2} \text{ and} \quad (11)$$

$$\beta = \frac{AD-BC}{C^2+D^2} \quad (11)$$

using the I/Q correction block of FIGS. 1 and 2.

Other alternatives are possible with other pre-calculation steps. In additional to (10), the correction matrix (9) is also equivalent to each of the following matrices:

$$\begin{bmatrix} \frac{C^2+D^2}{AD-BC} & -\frac{AC+BD}{AD-BC} \\ 0 & 1 \end{bmatrix} \quad (12)$$

$$\begin{bmatrix} \frac{AD-BC}{A^2+B^2} & 0 \\ -\frac{AC+BD}{A^2+B^2} & 1 \end{bmatrix} \text{ and} \quad (13)$$

$$\begin{bmatrix} 1 & 0 \\ -\frac{AC+BD}{AD-BC} & \frac{A^2+B^2}{AD-BC} \end{bmatrix} \quad (14)$$

Other than pre-calculations, all of these correction matrices can be implemented in a digital system using circuitry that implements only two multiplications and one addition. Such digital circuitry can be implemented as a Digital Signal Processor (DSP) programmed to execute a sequence of instructions to perform a process according to the disclosure. Such instructions can be obtained from a non-transitory machine readable medium. The DSP can receive data samples being operated through data path or from memory, for example.

While not separately depicted, for multiple RF chips in an upconverter for a transmitter, a correction matrix that is a transpose to the correction matrix (8) can be used. In other implementations, a correction matrix that is a transpose to any of the correction matrices (12)-(14) also could be used.

FIG. 2 depicts an example method of correcting I/Q imbalances in a downconverter. At 405, estimates of gain and phase imbalance can be made for each individual RF front ends. The gain and phase imbalances within a transmitter or receiver can vary relatively slowly, such that they can be estimated or measured infrequently. In some implementations, these values can be estimated or determined weekly, or daily. Updated values can be incorporated into the pre-calculated values [e.g., $\alpha$ $\beta$ of (10) and (11)] by first calculating according to (8). At 408, values for a correction matrix according to the disclosure can be (pre)calculated. Actions 405 and 408 can be conducted separately from the other actions depicted in the example method of FIG. 2. At 410, reception on multiple front ends occurs. At 412, a respective LO mixes with respective I and Q channels (LO is phase offset between I and Q) to recover baseband I/Q signal. Those I/Q signals are filtered at 414 and combined at 416. Those I/Q baseband components are digitized at 418 and the correction matrix is applied at 420. It would be apparent that the actions 405 and 408 do not need to be performed in the sequence depicted in FIG. 2 relative to the receiving actions.

Figure 3:
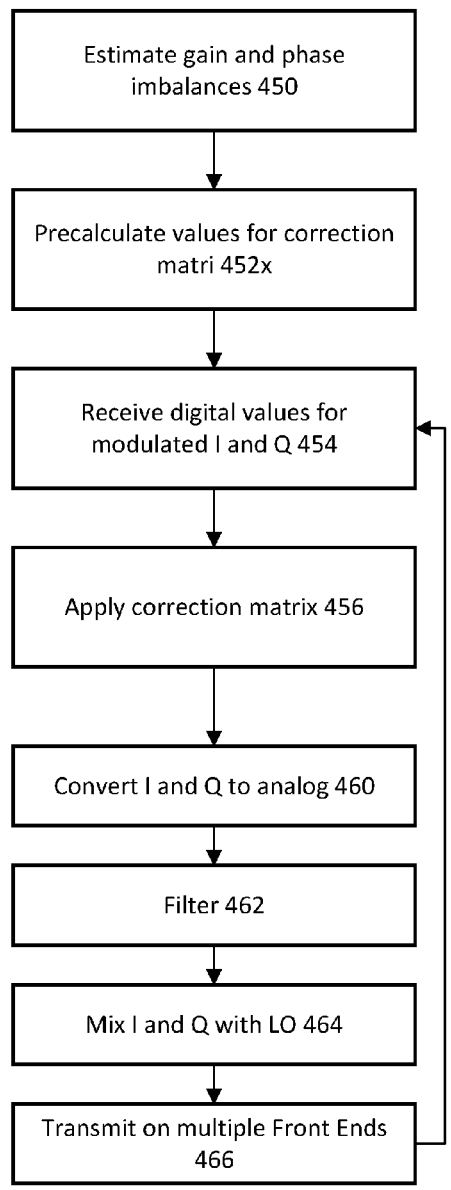
FIG. 3 depicts an example process implemented for I/Q imbalance correction in upconversion.

FIG. 3 depicts an example of upconversion and transmission from multiple RF front ends. At 450 and 452, gain and phase imbalances are estimated and values for a correction matrix are calculated. Digital values for modulated I and Q are received at 454, and the correction matrix applied at 456 to produce digital baseband I/Q signals. Digital baseband I/Q signals are converted to analog baseband I/Q signals at 460 and split to multiple branches. The analog baseband I/Q signals can be filtered at 462 and mixed with a LO signal at 464 to produce a signal transmitted from multiple front ends at 466.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Integrated circuits have become increasingly complex. Entire systems are constructed from diverse integrated circuit sub-systems. Describing such complex technical subject matter at an appropriate level of detail becomes necessary. In general, a hierarchy of concepts is applied to allow those of ordinary skill to focus on details of the matter being addressed.

Describing portions of a design (e.g., different functional units within an apparatus or system) according to functionality provided by those portions is often an appropriate level of abstraction, since each of these portions may themselves comprise hundreds of thousands, hundreds of millions, or more elements. When addressing some particular feature or implementation of a feature within such portion(s), it may be appropriate to identify substituent functions or otherwise characterize some sub-portion of that portion of the design in more detail, while abstracting other sub-portions or other functions.

A precise logical arrangement of the gates and interconnect (a netlist) implementing a portion of a design (e.g., a functional unit) can be specified. How such logical arrangement is physically realized in a particular chip (how that logic and interconnect is laid out in a particular design) may differ in different process technologies and/or for a variety of other reasons. Circuitry implementing particular functionality may be different in different contexts, and so disclosure of a particular circuit may not be the most helpful disclosure to a person of ordinary skill. Also, many details concerning implementations are often determined using design automation, proceeding from a high-level logical description of the feature or function to be implemented. In various cases, describing portions of an apparatus or system in terms of its functionality conveys structure to a person of ordinary skill in the art. As such, it is often unnecessary and/or unhelpful to provide more detail concerning a portion of a circuit design than to describe its functionality.

Functional modules or units may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented. In some situations, circuitry, units, and/or functional modules may be described partially in functional terms, and partially in structural terms. In some situations, the structural portion of such a description may be described in terms of a configuration applied to circuitry or to functional modules, or both.

Configurable circuitry is effectively circuitry or part of circuitry for each different operation that can be implemented by that circuitry, when configured to perform or otherwise interconnected to perform each different operation. Such configuration may come from or be based on instructions, microcode, one-time programming constructs, embedded memories storing configuration data, and so on. A unit or module for performing a function or functions refers, in some implementations, to a class or group of circuitry that implements the functions or functions attributed to that unit. Identification of circuitry performing one function does not mean that the same circuitry, or a portion thereof, cannot also perform other functions concurrently or serially.

Although circuitry or functional units may typically be implemented by electrical circuitry, and more particularly, by circuitry that primarily relies on transistors fabricated in a semiconductor, the disclosure is to be understood in relation to the technology being disclosed. For example, different physical processes may be used in circuitry implementing aspects of the disclosure, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology.

Embodiments according to the disclosure include non-transitory machine readable media that store configuration data or instructions for causing a machine to execute, or for configuring a machine to execute, or for describing circuitry or machine structures (e.g., layout) that can execute or otherwise perform, a set of actions or accomplish a stated function, according to the disclosure. Such data can be according to hardware description languages, such as HDL or VHDL, in Register Transfer Language (RTL), or layout formats, such as GDSII, for example.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It will be further understood that various changes in the details, materials, and arrangements of the parts which have been described and illustrated in order to explain embodiments of this invention may be made by those skilled in the art without departing from embodiments of the invention encompassed by the following claims.

I claim:

1. A method of receiving Inphase and Quadrature (I/Q) signal components in a Radio Frequency (RF) communication system, comprising:
   at each of a plurality of elements,
      receiving an RF signal to produce an analog signal comprising Inphase and Quadrature components,
      mixing an Inphase local oscillator signal with the received analog signal to produce an Inphase signal component,
      mixing a quadrature phase offset local oscillator signal with the received analog signal to produce a Quadrature signal component, and
      filtering each of the Inphase and Quadrature signal components;

combining the respective filtered Inphase components and combining the respective filtered Quadrature components;

digitizing each of the combined Inphase components and the combined Quadrature components; and applying a respective correction factor to each of the combined Inphase components and the combined Quadrature components, the correction factors calculated to compensate for an imbalance between the combined Inphase components and the combined Quadrature components, wherein each correction factor comprises a phase shift and scale factor, and wherein the applying includes no more than two multiplications and one addition for each pair of Inphase and Quadrature samples.

2. The method of claim 1, wherein the correction factors are determined by applying a phase rotation to the combined Inphase components and the combined Quadrature components to produce a 2×2 correction matrix with one entry having a value of 0 and another entry having a value of 1, and the applying comprises performing a matrix multiplication between the combined Inphase components and the combined Quadrature components and the 2×2 correction matrix.

3. The method of claim 1, wherein the 2×2 correction matrix is $$\begin{bmatrix} 1 & -\frac{AC+BD}{C^2+D^2} \\ 0 & \frac{AD-BC}{C^2+D^2} \end{bmatrix}$$

where A, B, C and D are calculated according to $$\begin{bmatrix} A & B \\ C & D \end{bmatrix} = \sum_{k=1}^{N} \gamma_k \begin{bmatrix} g_k \cos\left(\frac{\theta_k}{2}\right) & g_k \sin\left(\frac{\theta_k}{2}\right) \\ g_k^{-1} \sin\left(\frac{\theta_k}{2}\right) & g_k^{-1} \cos\left(\frac{\theta_k}{2}\right) \end{bmatrix} \begin{bmatrix} \cos\phi_k & -\sin\phi_k \\ \sin\phi_k & \cos\phi_k \end{bmatrix},$$

and $\theta_k$ and $g_k$ are respectively phase and gain imbalances between the I/Q components of a received kth RF signal from the kth RF front end, $\Phi_k$ is phase shift between the kth RF signal and a reference phase, and $\gamma_k$ is the gain difference between the RF signal and a reference gain.

4. The method of claim 3, wherein $$\alpha = -\frac{AC+BD}{C^2+D^2}$$

and a corrected combined Inphase component signal is equal to the combined Inphase component signals plus α multiplied by the combined Quadrature components.

5. The method of claim 3, wherein $$\beta = \frac{AD-BC}{C^2+D^2}$$

and a corrected combined Quadrature component signal is equal to multiplied by the combined Quadrature components.

6. The method of claim 1, wherein the 2×2 correction matrix is equivalent to $$\begin{bmatrix} D & -B \\ -C & A \end{bmatrix}$$

up to a scale factor and phase rotation, where A, B, C and D are calculated according to $$\begin{bmatrix} A & B \\ C & D \end{bmatrix} = \sum_{k=1}^{N} \gamma_k \begin{bmatrix} g_k \cos\left(\frac{\theta_k}{2}\right) & g_k \sin\left(\frac{\theta_k}{2}\right) \\ g_k^{-1} \sin\left(\frac{\theta_k}{2}\right) & g_k^{-1} \cos\left(\frac{\theta_k}{2}\right) \end{bmatrix} \begin{bmatrix} \cos\phi_k & -\sin\phi_k \\ \sin\phi_k & \cos\phi_k \end{bmatrix},$$

and $\delta_k$ and $g_k$ are respectively phase and gain imbalances between the I and Q components of a received kth RF signal from the kth RF front end, $\phi_k$ is phase shift between the kth RF signal and a reference phase, and $\gamma_k$ is the gain difference between the RF signal and a reference gain.

7. The method of claim 6, wherein the 2×2 correction matrix is $$\begin{bmatrix} \frac{AD-BC}{A^2+B^2} & 0 \\ -\frac{AC+BD}{A^2+B^2} & 1 \end{bmatrix}.$$

8. The method of claim 6, wherein the 2×2 correction matrix is $$\begin{bmatrix} 1 & 0 \\ -\frac{AC+BD}{AD-BC} & \frac{A^2+B^2}{AD-BC} \end{bmatrix}.$$

9. The method of claim 6, wherein the 2×2 correction matrix is $$\begin{bmatrix} \frac{C^2+D^2}{AD-BC} & -\frac{AC+BD}{AD-BC} \\ 0 & 1 \end{bmatrix}.$$

10. A method of transmitting a signal with Inphase and Quadrature (I/Q) signal components in a Radio Frequency (RF) communication system, comprising:

applying a respective correction factor to Inphase (I) and Quadrature (Q) components of a digital signal, each correction factor calculated to compensate for an imbalance between the I component and the Q component, wherein each correction factor comprises a phase shift and scale factor, and wherein the applying includes no more than two multiplications and one addition total for each pair of I and Q samples;

converting the corrected I and Q components to analog;

splitting the corrected I component to a plurality of transmit paths with different analog I components;

splitting the corrected Q component to a plurality of transmit paths with different analog Q components;

mixing the different analog I components with an Inphase local oscillator signal, mixing the different analog Q components with a quadrature phase offsetted oscillator signal, and transmitting each of the mixed Q and I components from the plurality of transmit paths.

11. The method of claim 10, wherein the 2×2 correction matrix is $$\begin{bmatrix} 1 & 0 \\ -\frac{AC+BD}{C^2+D^2} & \frac{AD-BC}{C^2+D^2} \end{bmatrix},$$

where A, B, C and D are calculated according to $$\begin{bmatrix} A & C \\ B & D \end{bmatrix} = \sum_{k=1}^{N} \gamma_k \begin{bmatrix} \cos\phi_k & \sin\phi_k \\ -\sin\phi_k & \cos\phi_k \end{bmatrix} \begin{bmatrix} g_k\cos\left(\frac{\theta_k}{2}\right) & g_k^{-1}\sin\left(\frac{\theta_k}{2}\right) \\ g_k\sin\left(\frac{\theta_k}{2}\right) & g_k^{-1}\cos\left(\frac{\theta_k}{2}\right) \end{bmatrix},$$

and $\delta_k$ and $g_k$ are respectively phase and gain imbalances between the I/Q components of a received kth RF signal from the kth RF front end, $\phi_k$ is phase shift between the kth RF signal and a reference phase, and $\gamma_k$ is the gain difference between the RF signal and a reference gain.

12. The method of claim 10, wherein the 2×2 correction matrix is equivalent to $$\begin{bmatrix} D & -C \\ -B & A \end{bmatrix}$$

up to a scale factor and phase rotation, where A, B, C and D are calculated according to $$\begin{bmatrix} A & C \\ B & D \end{bmatrix} = \sum_{k=1}^{N} \gamma_k \begin{bmatrix} \cos\phi_k & \sin\phi_k \\ -\sin\phi_k & \cos\phi_k \end{bmatrix} \begin{bmatrix} g_k\cos\left(\frac{\theta_k}{2}\right) & g_k^{-1}\sin\left(\frac{\theta_k}{2}\right) \\ g_k\sin\left(\frac{\theta_k}{2}\right) & g_k^{-1}\cos\left(\frac{\theta_k}{2}\right) \end{bmatrix},$$

and $\delta_k$ and $g_k$ are respectively phase and gain imbalances between the I and Q components of a received kth RF signal from the kth RF front end, $\Phi_k$ is phase shift between the kth RF signal and a reference phase, and $\gamma_k$ is the gain difference between the RF signal and a reference gain.

13. A method of correcting imbalance between Inphase (I) and Quadrature (Q) (I/Q) signal components in an Radio Frequency (RF) communication system with multiple front ends, comprising:

providing a correction matrix based on gain and phase differences between I and Q components of a digital signal, the correction matrix having two rows and two columns, wherein one entry is zero, one entry is 1, and the remaining values are constants that are pre-calculated based on an I/Q imbalance;

matrix multiplying the correction matrix with I and Q sample components of the digital signal to produce corrected I and Q components;

if transmitting the digital signal, converting the corrected I and Q components to analog components, mixing with a respective Local Oscillator to produce mixed I and Q components and transmitting the mixed I and Q components through multiple front ends, and if receiving, converting multiple versions of an analog signal received through multiple front ends into respective baseband I and Q components, digitizing the baseband I and Q components, combining the respective digitized baseband I and Q components, and performing the matrix multiplication on the combined baseband I and Q components.

* * * * *